(12) United States Patent
Watanabe et al.

(10) Patent No.: US 11,456,556 B2
(45) Date of Patent: Sep. 27, 2022

(54) BRACKET WITH AN OVERLAPPING PORTION AND CONNECTOR ASSEMBLY HAVING THE BRACKET

(71) Applicant: Tyco Electronics Japan G.K., Kawasaki (JP)

(72) Inventors: Tatsuki Watanabe, Kawasaki (JP); Katsuhiko Kobayashi, Kawasaki (JP)

(73) Assignee: Tyco Electronics Japan G.K., Kawasaki (JP)

( * ) Notice: Subject to any disclaimer, the term of this patent is extended or adjusted under 35 U.S.C. 154(b) by 0 days.

(21) Appl. No.: 17/154,242

(22) Filed: Jan. 21, 2021

(65) Prior Publication Data
US 2021/0234299 A1    Jul. 29, 2021

(30) Foreign Application Priority Data

Jan. 24, 2020   (JP) .............................. JP2020-009677

(51) Int. Cl.
| | |
|---|---|
| *H01R 13/506* | (2006.01) |
| *H01R 13/514* | (2006.01) |
| *H01R 12/72* | (2011.01) |
| *F16M 13/02* | (2006.01) |

(52) U.S. Cl.
CPC .......... *H01R 13/506* (2013.01); *F16M 13/02* (2013.01); *H01R 12/721* (2013.01); *H01R 13/514* (2013.01)

(58) Field of Classification Search
CPC ... H01R 13/506; H01R 13/514; H01R 12/721
USPC .................. 439/61, 607.35–607.55
See application file for complete search history.

(56) References Cited

U.S. PATENT DOCUMENTS

| | | | |
|---|---|---|---|
| 6,764,339 B2 | 7/2004 | Kubo | |
| 6,984,151 B2* | 1/2006 | Wu | H01R 13/6581 439/465 |
| 7,153,158 B1* | 12/2006 | Lee | H01R 13/6658 439/620.01 |
| 7,465,194 B1* | 12/2008 | Ho | H01R 13/26 439/607.01 |
| 7,997,920 B1* | 8/2011 | Sun | H01R 13/6275 439/345 |
| 8,011,960 B2* | 9/2011 | Xiao | H01R 13/6583 439/607.56 |

(Continued)

FOREIGN PATENT DOCUMENTS

| | | |
|---|---|---|
| JP | 2587784 Y2 | 12/1998 |
| JP | 2003187916 A | 7/2003 |

(Continued)

OTHER PUBLICATIONS

Abstract of JP 2012 248391, dated Dec. 13, 2012, 1 page.

*Primary Examiner* — Peter G Leigh
(74) *Attorney, Agent, or Firm* — Barley Snyder (57) ABSTRACT

A bracket includes an upper bracket and a lower bracket. The upper bracket and the lower bracket support a supported body from above and below between the upper bracket and the lower bracket. The lower bracket has a pair of lateral lower bracket sidewall portions overlapping with a pair of lateral upper bracket sidewall portions of the upper bracket. The lateral lower bracket sidewall portions catch with the lateral upper bracket sidewall portions to catch the lower bracket on the upper bracket.

11 Claims, 6 Drawing Sheets

(56) References Cited

U.S. PATENT DOCUMENTS

| | | | | |
|---|---|---|---|---|
| 8,100,709 | B2* | 1/2012 | Zhang | H01R 13/6583 439/353 |
| 8,142,226 | B2* | 3/2012 | Xiao | H01R 27/02 439/607.56 |
| 8,303,344 | B2* | 11/2012 | Xiao | H01R 27/02 439/607.56 |
| 8,668,523 | B2* | 3/2014 | Wu | H01R 13/5812 439/607.23 |
| 8,764,486 | B2* | 7/2014 | Ii | H01R 13/65918 439/607.46 |
| 8,870,596 | B2* | 10/2014 | Ii | H01R 13/6581 439/607.41 |
| 8,939,777 | B2* | 1/2015 | Lin | H01R 24/60 439/660 |
| 9,397,433 | B2* | 7/2016 | Kao | H01R 24/60 |
| 9,472,907 | B2* | 10/2016 | Kao | H01R 13/6595 |
| 9,531,138 | B2* | 12/2016 | Xing | H01R 13/7172 |
| 9,627,815 | B2* | 4/2017 | Wu | H01R 13/6581 |
| 9,819,128 | B2* | 11/2017 | Zhou | H01R 13/7172 |
| 2011/0124225 | A1* | 5/2011 | Zhou | H01R 13/6593 439/607.01 |
| 2011/0281464 | A1* | 11/2011 | Hou | H01R 13/6593 439/607.55 |
| 2013/0052866 | A1* | 2/2013 | Ii | H01R 13/6581 439/607.41 |
| 2016/0254621 | A1* | 9/2016 | Wu | H01R 13/6593 439/607.47 |

FOREIGN PATENT DOCUMENTS

| | | |
|---|---|---|
| JP | 2007-115582 A | 5/2007 |
| JP | 201040215 A | 2/2010 |
| JP | 2012248391 A | 12/2012 |

* cited by examiner

BRACKET WITH AN OVERLAPPING PORTION AND CONNECTOR ASSEMBLY HAVING THE BRACKET

CROSS-REFERENCE TO RELATED APPLICATION

This application claims the benefit of the filing date under 35 U.S.C. § 119(a)-(d) of Japanese Patent Application No. 2020-009677, filed on Jan. 24, 2020.

FIELD OF THE INVENTION

The present invention relates to a connector assembly and, more particularly, to a bracket for a connector assembly.

BACKGROUND

Some connectors are of a so-called floating type that mates with a mating connector while correcting misalignment therefrom. For example, Japanese Patent Application No. 2007-115582A discloses a connector provided with a housing and a plurality of terminals, each terminal having a base portion, a solder tail portion, and a displacement absorbing portion having springiness between the base portion and the solder tail portion. Misalignment occurring during mating with the mating connector is absorbed by the displacement absorbing portion.

In JP 2007-115582A, each terminal has the displacement absorbing portion bulging horizontally, resulting in enlargement of the connector. Therefore, a structure smaller in size than a structure utilizing the springiness of a contact for correcting misalignment from the mating connector is desired.

In order to meet this demand for downsizing, a bracket separable into an upper bracket and a lower bracket for the ease of assembly is prepared. The brackets form a structure supporting a plurality of connectors in a covering manner from above and below. The plurality of connectors are covered with the brackets, a clearance is set between the brackets and each connector, and thereby floating can be achieving.

In the case of this structure, when a plug portion in a state of being plugged in the mating connector is extracted from the mating connector, the upper bracket is pinched with fingers from both sides and pulled out. That is, when the plug portion is extracted from the mating connector, a force is applied to the upper bracket. Thereupon, the upper bracket deflects, and this deflection might cause release of a catch between the upper bracket and the lower bracket, resulting in the upper bracket coming off, leaving the circuit board and/or the lower bracket behind. That is, the upper bracket and the lower bracket after assembly can separate unintentionally. This problem is not unique to the type of bracket that supports a connector as a supported body such that the connector is covered from above and below; this problem is common to brackets having a structure separable into an upper bracket and a lower bracket for the ease of assembly or the like.

SUMMARY

A bracket includes an upper bracket and a lower bracket. The upper bracket and the lower bracket support a supported body from above and below between the upper bracket and the lower bracket. The lower bracket has a pair of lateral lower bracket sidewall portions overlapping with a pair of lateral upper bracket sidewall portions of the upper bracket. The lateral lower bracket sidewall portions catch with the lateral upper bracket sidewall portions to catch the lower bracket on the upper bracket.

BRIEF DESCRIPTION OF THE DRAWINGS

The invention will now be described by way of example with reference to the accompanying Figures, of which.

DETAILED DESCRIPTION OF THE EMBODIMENT(S)

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. Furthermore, several aspects of the embodiments may form—individually or in different combinations—solutions according to the present invention. The following described embodiments thus can be considered either alone or in an arbitrary combination thereof.

A connector assembly 10A according to an embodiment is shown in FIG. 1A-3. The connector assembly 10A includes a bracket 20 and a subassembly 30 accommodated in the bracket 20. The subassembly 30 in the shown embodiment is composed of four individual connectors 40 and as many (four) circuit boards 50. Any or all of the subassembly 30, the connectors 40, and the circuit boards 50 may be referred to as a supported body herein.

The individual connectors 40 are equivalent to an example of a first connector defined in the present invention. These individual connectors 40 are arranged laterally (Y direction) with a mating portion 41 facing sideward. In addition, the circuit boards 50 are each connected to a corresponding one of the individual connectors 40, and arranged laterally (Y direction) in an attitude having a plug portion 51 to be plugged into a mating connector 70 (see FIG. 2) facing downward. The mating connector 70 is equivalent to an example of a second connector defined in the present invention.

The bracket 20 is composed of an upper bracket 20A and a lower bracket 20B formed by cutting and forming processes of a sheet metal. Then, the upper bracket 20A and the lower bracket 20B are caught on each other, and support the individual connectors 40 such that the individual connectors 40 of the subassembly 30 are sandwiched from above and below.

Figure 1A:
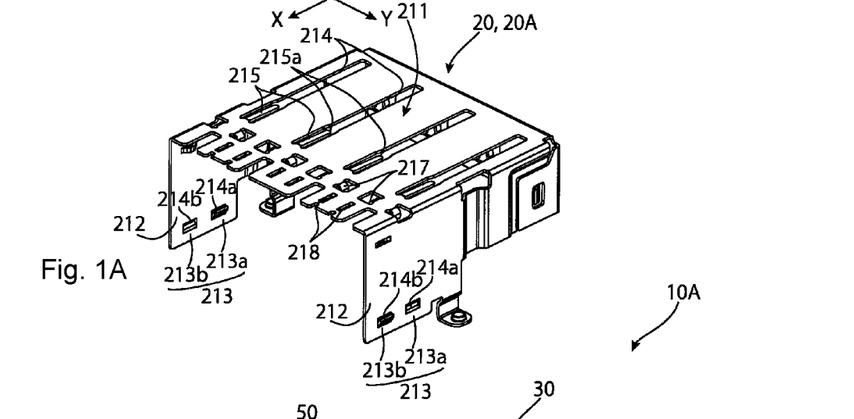
FIG. 1A is a perspective view of an upper bracket of a connector assembly according to an embodiment.

The upper bracket 20A has an upper bracket base portion 211 and a pair of lateral upper bracket sidewall portions 212, as shown in FIG. 1A. The upper bracket base portion 211 rests on the individual connectors 40 arranged. In addition, the pair of lateral upper bracket sidewall portions 212 extend downward from both lateral ends of the upper bracket base portion 211 to a height at which the upper bracket sidewall portion 212 overlaps a lower bracket sidewall portion 222, described later, laterally (Y direction).

Figure 1B:
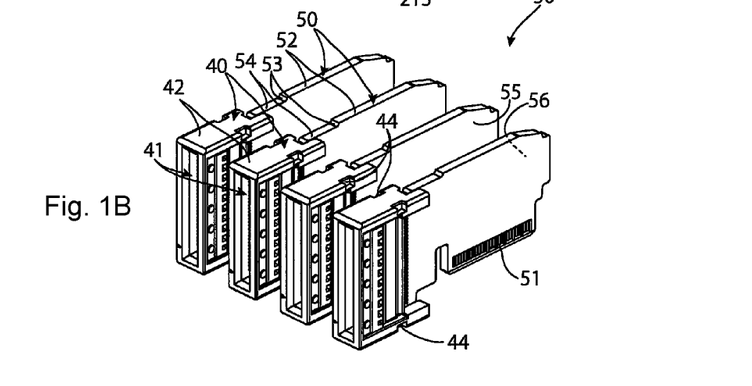
FIG. 1B is a perspective view of a subassembly of the connector assembly of FIG. 1A.
Figure 1C:
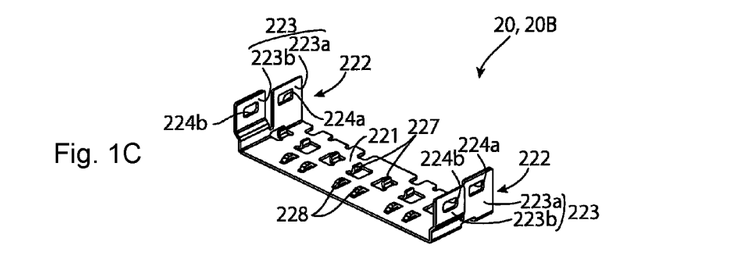
FIG. 1C is a perspective view of a lower bracket of the connector assembly of FIG. 1A.

As shown in FIG. 1C, the lower bracket 20B has a lower bracket base portion 221 and the pair of lateral lower bracket sidewall portions 222. The lower bracket base portion 221 supports lower faces of the individual connectors 40 arranged. The pair of lateral lower bracket sidewall portions 222 extend upward from both lateral ends of the lower bracket base portion 221.

Figure 2:
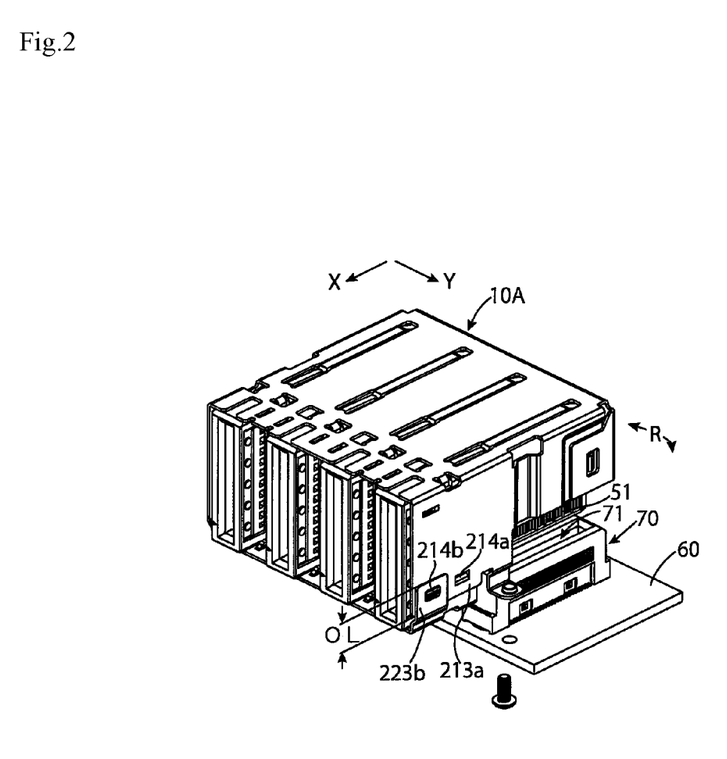
FIG. 2 is a perspective view of the connector assembly of FIGS. 1A-1C and a mating connector before mating.

A portion where the upper bracket sidewall portion 212 and the lower bracket sidewall portion 222 overlap each other is referred to as overlapping portion OL, shown in FIG. 2. In the overlapping portion OL, an upper bracket overlapping portion 213 and a lower bracket overlapping portion 223 overlap each other. Here, a first portion 213a and a second portion 213b of the upper bracket overlapping portion 213 are provided on the same plane as each other of the upper bracket sidewall portion 212. In contrast, a first portion 223a and a second portion 223b of the lower bracket overlapping portion 223 are offset widthwise (Y direction) from each other.

Then, the upper bracket overlapping portion 213 and the lower bracket overlapping portion 223 are overlapped as shown in FIG. 2. Thereupon, the first portion 223a of the lower bracket overlapping portion 223 is located widthwise (Y direction) inside in relation to the first portion 213a of the upper bracket overlapping portion 213. That is, the first portions 223a of the lower bracket overlapping portions 223 are located inside between the first portions 213a of the pair of lateral upper bracket overlapping portions 213. In contrast, the second portion 223b of the lower bracket overlapping portion 223 is located widthwise (Y direction) outside in relation to the second portion 213b of the upper bracket overlapping portion 213. That is, the second portions 223b of the lower bracket overlapping portions 223 are located outside the inside between the second portions 213b of the pair of lateral upper bracket overlapping portions 213. In this manner, the upper bracket sidewall portion 212 is sandwiched by the lower bracket sidewall portion 222 from inside and outside.

As shown in FIGS. 1A-1C, catch holes 224a, 224b are formed in the first portion 223a and the second portion 223b of the lower bracket overlapping portion 223, respectively. A lanced tab 214a extending inward is formed on the first portion 213a of the upper bracket overlapping portion 213. On the other hand, a lanced tab 214b extending outward is formed on the second portion 213b of the upper bracket overlapping portion 213.

The connector assembly 10A is assembled as shown in FIG. 2. Thereupon, the upper bracket overlapping portion 213 and the lower bracket overlapping portion 223 overlap each other. At this time, the lanced tab 214a enters the catch hole 224a from widthwise outside to catch the upper bracket 20A and the lower bracket 20B on each other. On the other hand, the lanced tab 214b enters the catch hole 224b from widthwise inside to catch the upper bracket 20A and the lower bracket 20B on each other. Once this connector assembly 10A is assembled, the upper bracket 20A and the lower bracket 20B are caught on each other with both the lanced tab 214a extending inward and the lanced tab 214b extending outward, as described above.

In the first embodiment, the lower bracket sidewall portion 222 and the upper bracket sidewall portion 212 are assumed to be a first sidewall portion and a second sidewall portion defined in the present invention, respectively. In this case, the first portion 223a and the second portion 223b of the lower bracket overlapping portion 223 are equivalent to respective examples of a first adjacent portion and a second adjacent portion defined in the present invention. Furthermore, the catch holes 224a, 224b formed in the first portion 223a and the second portion 223b are equivalent to respective examples of a first catch portion and a second catch portion defined in the present invention. In addition, the first portion 213a and the second portion 213b of the upper bracket overlapping portion 213 are equivalent to respective examples of a third adjacent portion and a fourth adjacent portion defined in the present invention. Furthermore, the lanced tabs 214a, 214b provided on the first portion 213a and the second portion 213b of the upper bracket overlapping portion 213 are equivalent to respective examples of a third catch portion and a fourth catch portion defined in the present invention.

In addition, in this first embodiment, the upper bracket sidewall portion 212 can also be assumed to be the first sidewall portion defined in the present invention, and the lower bracket sidewall portion 222 to be the second sidewall portion defined in the present invention. In this case, the second portion 213b of the upper bracket overlapping portion 213 is equivalent to an example of the first adjacent portion defined in the present invention. Furthermore, the first portion 213a of the upper bracket overlapping portion 213 is equivalent to an example of the second adjacent portion defined in the present invention. In addition, the lanced tabs 214b, 214a formed on the second portion 213b and the first portion 213a are equivalent to respective examples of the first catch portion and the second catch portion defined in the present invention. In addition, the second portion 223b and the first portion 223a of the lower bracket overlapping portion 223 are equivalent to respective examples of the third adjacent portion and the fourth adjacent portion defined in the present invention. Furthermore, the catch holes 224b, 224a provided in the second portion 223b and the first portion 223a of the lower bracket overlapping portion 223 are equivalent to respective examples of the third catch portion and the fourth catch portion defined in the present invention.

The subassembly 30 is composed of the four individual connectors 40 and the four circuit boards 50, as shown in FIG. 1B. Each circuit board 50 is connected to a corresponding one of the individual connectors 40, and the circuit board 50 and the individual connector 40 are integrated in each pair.

As shown in FIG. 1B, the four circuit boards 50 each have the plug portion 51 to be plugged into a mating opening 71 of the mating connector 70 shown in FIG. 2. The plug portion 51 and the individual connector 40 are electrically connected together via printed wiring on the circuit board 50. Furthermore, these circuit boards 50 are arranged in an attitude having a first main face 55 opposite a second main face 56 of the adjacent circuit board, and accommodated in the bracket 20. The individual connector 40 is retained in the bracket 20 such that the mating portion 41 faces sideward when the plug portion 51 is turned downward.

The upper bracket base portion 211 becomes an upper face of the connector assembly 10A when the plug portion 51 is turned downward. When the connector assembly 10A and the mating connector 70 are mated together, the plug portion 51 is put on the mating opening 71 of the mating connector 70 and the upper bracket base portion 211 is pressed. Thereby, the plug portion 51 is plugged into the mating connectors 70.

The bracket 20 retains the four circuit boards 50 such that each circuit board 50 can make a predetermined amount of independent movement in both two directions within a horizontal plane (X direction and Y direction). Specifically, the connector assembly 10A has the following structure.

A slit 214 corresponding to each circuit board 50 and extending in the X direction is formed in the upper bracket 20A, as shown in FIG. 1A. Furthermore, a cantilever-shaped abutting tab 215 extends rearward from front in the X direction in each slit 214. The circuit board 50 has, at a front in the X direction of its upper end face 52, a low height portion 54 so formed as to be lowered by one step with a step 53. The height of this step 53 is equivalent to the wall thickness of the bracket 20, as shown in FIG. 1B. As shown in FIG. 2, in the connector assembly 10A in an assembled state, a rear portion in the X direction behind the step 53 of the upper end face 52 of the circuit board 50 enters the slit 214 and is substantially flush with an upper face portion 23 of the bracket 20. Furthermore, the abutting tab 215 extends toward the step 53 above the low height portion 54 of the upper end face 52 of the circuit board 50.

A gap exists between a rear end 215a of the abutting tab 215 and the step 53, so that each circuit board 50 can move in the X direction by the amount of the gap independently of the other circuit boards 50. In addition, a recessed portion 44 is formed on both lateral (Y direction) sides of an upper face 42 and a lower face 43 of the individual connector 40. Furthermore, lanced tabs 217, 227 entering these recessed portions 44 are provided on the upper bracket 20A and the lower bracket 20B, as shown in FIGS. 1A-1C. The lanced tabs 217, 227 enter the recessed portions 44 having a dimension in the X direction larger than a dimension in the X direction of the lanced tabs 217, 227, and thereby a predetermined amount of longitudinal (X direction) movement of the circuit board 50 is allowed, and simultaneously this movement is limited. In this manner, with respect to the X direction, the abutting tab 215, the recessed portions 44 and the lanced tabs 217, 227 allow each circuit board 50 to move by a predetermined amount independently.

It should be noted that since the circuit board 50 and the individual connector 40 are integrated as the subassembly 30 in each pair, hereinbelow, in the description of movement of each pair, the movement will be described as movement of the circuit board 50 with the individual connector 40 omitted.

In the case of the connector assembly 10A of this first embodiment, the longitudinal (X direction) movement is restricted by the abutting tab 215, the recessed portions 44 and the lanced tabs 217, 227. In addition, these lanced tabs 217, 227 are spaced from a wall face facing widthwise (Y direction) of the recessed portions 44. Each circuit board 50 is allowed to move widthwise (Y direction) by the amount of this space.

In addition, bulging tabs 218, 228 bulging inward are provided on the upper bracket 20A and the lower bracket 20B, as shown in FIGS. 1A and 1C. These bulging tabs 218, 228, in the assembled state of the connector assembly 10A, are spaced slightly from a side face 45 of the individual connector 40, and arranged in a position facing the side face 45. Thereby, the circuit board 50 is also allowed by these bulging tabs 218, 228 to move widthwise (Y direction) by the amount of the space. In this manner, in the case of the connector assembly 10A of the first embodiment, the widthwise (Y direction) movement is restricted at two locations: the lanced tabs 217, 227 and the bulging tabs 218, 228.

The four circuit boards 50 constituting this connector assembly 10A are retained in the bracket 20 such that they can move individually independently by the respective predetermined amounts in both the X direction and the Y direction. In addition, since each circuit board 50 can move in both the X direction and the Y direction, inclination within an X-Y plane (inclination in a rotational direction shown by an arrow R in FIG. 2) is also allowed.

The mating connector 70 to be mated with the connector assembly 10A of the first embodiment in the state of being fixed by soldering on a circuit board 60 is shown in FIG. 2. The same number of (four) mating connectors 70 as the circuit boards 50 are arranged on the circuit board 60 at the same spaces as arrangement spaces of the circuit boards 50 constituting the connector assembly 10A. These mating connectors 70 are sometimes fixed in a position offset from a reference position in the X direction and/or the Y direction when they are soldered to the circuit board 60. In addition, these mating connectors 70 are sometimes fixed in an attitude inclined in the direction of the arrow R when they are soldered to the circuit board 60. The connector assembly 10A of this first embodiment is accommodated in the bracket 20 with each circuit board 50 having a clearance required for floating so that the connector assembly 10A can mate with the mating connector 70 even if the mating connector is misaligned and/or inclined.

Figure 3:
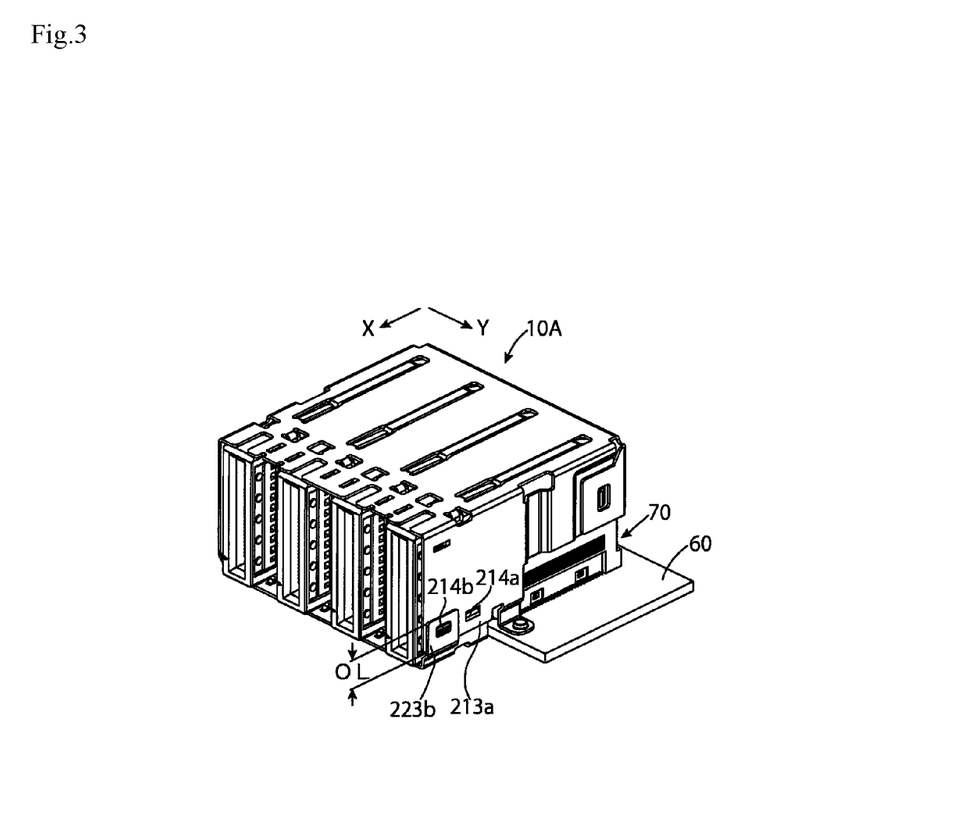
FIG. 3 is a perspective view of the connector assembly of FIGS. 1A-1C and the mating connector in a mated state.

Next, a situation in which the connector assembly 10A in a state shown in FIG. 3, which has been mated with the mating connector 70, is extracted from the mating connector 70 will be described.

For this extraction, the upper bracket 20A is held in a pinching manner with fingers from right and left and lifted up. During this holding, the upper bracket 20A deflects, and this deflection reaches the lower bracket 20B, resulting in the lower bracket 20B also deflecting. Furthermore, how they deflect differs according to the positions of the fingers pinching the upper bracket 20 and/or how to apply a force. Therefore, depending on how they deflect, the lanced tab 214a that has entered the catch hole 224a from widthwise outside sometimes almost comes out of the catch hole 224a. In that case, however, simultaneously, the lanced tab 214b that has entered the other catch hole 224b from widthwise inside attempts to go deeper into the catch hole 224b. Thereby, the upper bracket 20A and the lower bracket 20B are kept caught on each other, so that the connector assembly 10A can be extracted from the mating connector 70.

Alternatively, depending on how they deflect, the lanced tab 214b that has entered the catch hole 224b from widthwise inside sometimes almost comes out of the catch hole 224b. In that case, however, simultaneously, the lanced tab 214a that has entered the other catch hole 224a from widthwise outside attempts to go deeper into the catch hole 224a. Therefore, in this case, similarly, the upper bracket 20A and the lower bracket 20B are kept caught on each other, so that the connector assembly 10A can be extracted from the mating connector 70.

In this manner, in the connector assembly 10A of this first embodiment, the lanced tab 214a is made to enter the catch hole 224a from widthwise outside. Furthermore, simultaneously, the lanced tab 214b is made to enter the catch hole 224b from widthwise inside. Since the connector assembly 10A of this first embodiment adopts this catch structure, the upper bracket 20A and the lower bracket 20B are kept caught on each other even if the upper bracket 20A and/or the lower bracket 20B deflects during extraction from the mating connector 70. The third catch portion catches the first catch portion from outside, and the fourth catch portion catches the second catch portion from inside. Therefore, at least one of the catches is kept in whichever direction the upper bracket 20A, for example, deflects, inward or outward, when a force is applied to the bracket 20. Therefore, the upper bracket 20A and the lower bracket 20B are difficult to separate after assembly and the upper bracket 20A is prevented from coming off alone, so that the upper bracket 20A and the lower bracket 20B and further the subassembly 30 retained by them are integrally extracted from the mating connector 70. A catch structure between the first catch portion and the third catch portion and a catch structure between the second catch portion and the fourth catch portion, which support the supported body having the same dimensions without increasing a lateral dimension of the bracket 20, can be configured.

A connector assembly 10B of a second embodiment of the present invention is shown in FIGS. 4A-6 and will now be described. Regarding the connector assembly 10B of this second embodiment, an element corresponding to an element of the connector assembly 10A of the first embodiment will be denoted by the same reference sign. Furthermore, only a difference from the connector assembly 10A of the first embodiment will be described.

The bracket 20 constituting the connector assembly 10B shown in FIGS. 4A-6 is a bracket as the second embodiment of the present invention. The difference of this connector assembly 10B from the connector assembly 10A of the first embodiment lies in the structure of the overlapping portion OL of the bracket 20. In this overlapping portion OL, as in the overlapping portion OL in the first embodiment, the upper bracket overlapping portion 213 and the lower bracket overlapping portion 223 overlap each other.

Figure 4A:
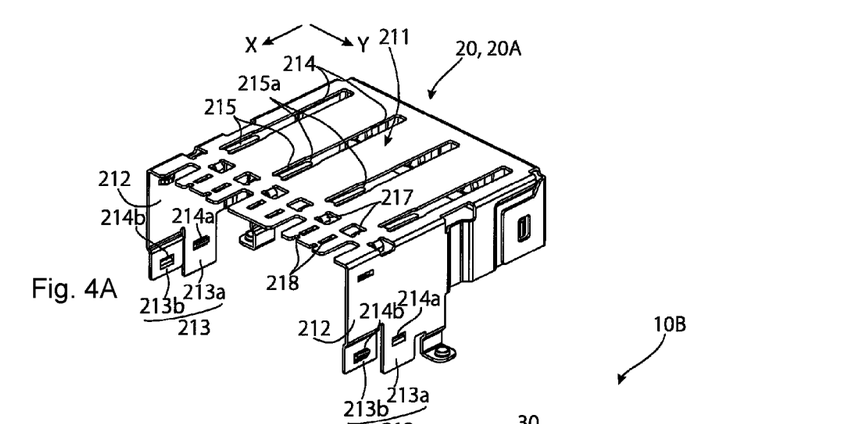
FIG. 4A is a perspective view of an upper bracket of a connector assembly according to another embodiment.
Figure 4B:
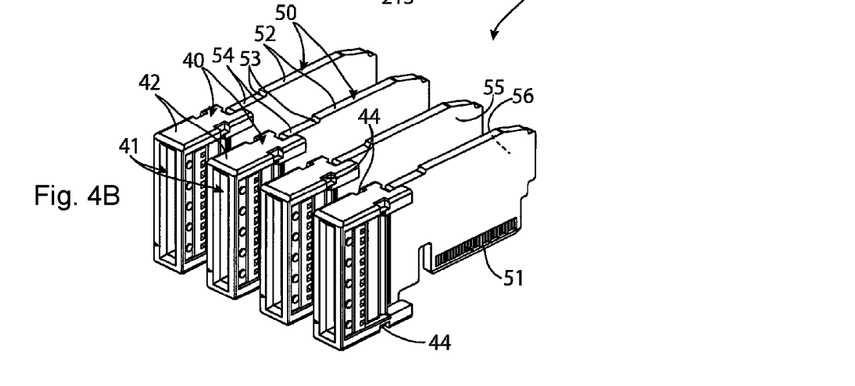
FIG. 4B is a perspective view of a subassembly of the connector assembly of FIG. 4A.

In the case of the first embodiment, the first portion 213a and the second portion 213b of the upper bracket overlapping portion 213 are provided on the same plane as each other of the upper bracket sidewall portion 212. In contrast, in the case of this second embodiment, as shown in FIG. 4A, the first portion 213a of the upper bracket overlapping portion 213 is flush with the upper bracket sidewall portion 212 extending downward from the end of the upper bracket base portion 211. This first portion 213a is located widthwise outside the lower bracket sidewall portion 222. Specifically, this first portion 213a is located widthwise outside the first portion 223a of the lower bracket overlapping portion 223. Here, the first portion 213a of the upper bracket overlapping portion 213 is equivalent to an example of an outer adjacent portion defined in the present invention. This outer adjacent portion is an adjacent portion on the upper bracket side of the second adjacent portion and the third adjacent portion.

In addition, as shown in FIG. 4A, the second portion 213b of the upper bracket overlapping portion 213 bends so as to be located inside the lower bracket sidewall portion 222 in the course of downward extension of the upper bracket sidewall portion 212, and further extends downward. Furthermore, this second portion 213b is located inside the lower bracket sidewall portion 222, namely inside the second portion 223b of the lower bracket overlapping portion 223. This second portion 213b is located widthwise inside in relation to the first portion 213a by an amount equivalent to one plate thickness. Here, the second portion 213b of the upper bracket overlapping portion 213 is equivalent to an example of an inner adjacent portion defined in the present invention. This inner adjacent portion is an adjacent portion on the upper bracket side of the first adjacent portion and the fourth adjacent portion defined in the present invention.

Figure 4C:
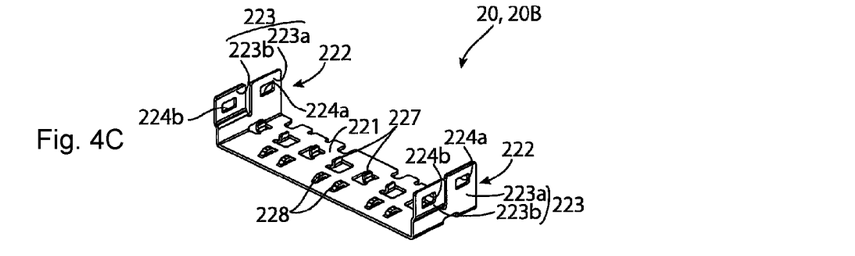
FIG. 4C is a perspective view of a lower bracket of the connector assembly of FIG. 4A.

In the embodiment shown in FIG. 4C, the first portion 223a of the lower bracket overlapping portion 223 is located in a position extending vertically upward from the end of the lower bracket base portion 221. In contrast, the second portion 223b of the lower bracket overlapping portion 223 is located in a position offset widthwise inside in relation to the first portion 223a by the amount of one plate thickness.

Figure 5:
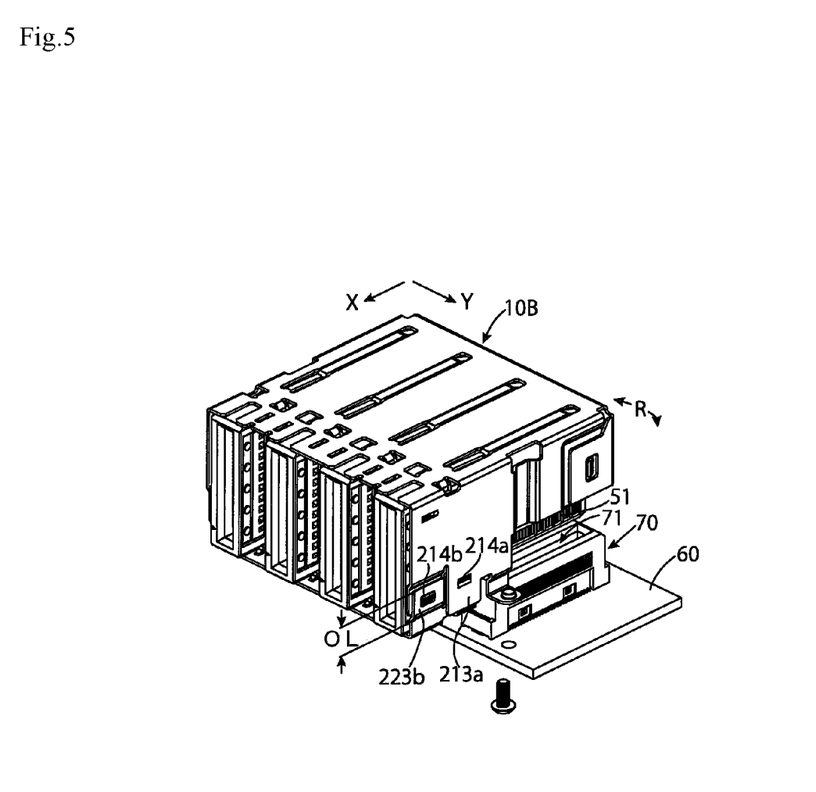
FIG. 5 is a perspective view of the connector assembly of FIGS. 4A-4C and a mating connector before mating.
Figure 6:
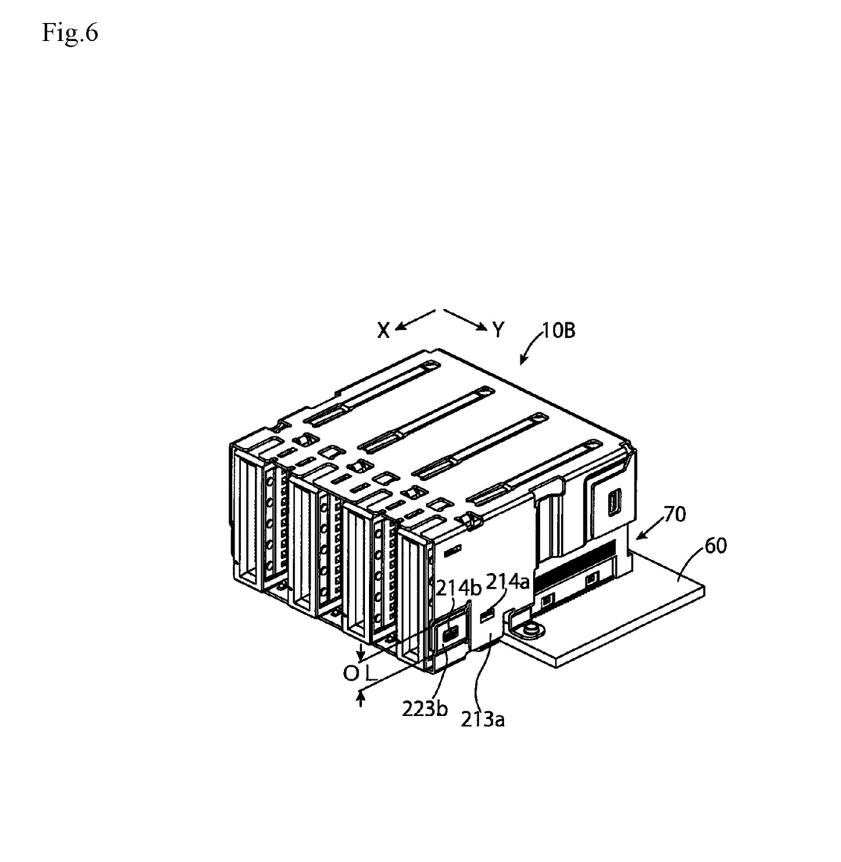
FIG. 6 is a perspective view of the connector assembly of FIGS. 4A-4C and the mating connector in a mated state.

The connector assembly 10B according to the second embodiment is assembled, and thereby the upper bracket overlapping portion 213 and the lower bracket overlapping portion 223 are put into such an overlapping state as shown in FIG. 5. Thereupon, the first portions 213a, 223a and the second portions 213b, 223b are put into a state in which they switch positions in a thickness direction (Y direction) and overlap each other. The first embodiment described above has a structure in which the upper bracket sidewall portion 212 is sandwiched between the first portion 223a and the second portion 223b of the lower bracket overlapping portion 223. Therefore, the second portion 223b of the lower bracket overlapping portion 223 protrudes widthwise more than the upper bracket sidewall portion 212 by the amount of the plate thickness, and the widthwise dimension is increased by the amount of that protrusion. In contrast, in the case of the second embodiment, since the first portions 213a, 223a and the second portions 213b, 223b switch positions in the thickness direction (Y direction), the widthwise dimension is defined by the upper bracket sidewall portions 212. Therefore, in this second embodiment, as compared with the first embodiment described above, the widthwise dimension can be reduced.

In this second embodiment, similarly, the lanced tab 214a lanced inward is formed on the first portion 213a of the upper bracket overlapping portion 213, and the lanced tab 214b lanced outward is formed on the second portion 213b, as shown in FIG. 4A. In addition, the respective catch holes 224a, 224b are formed in the first portion 223a and the second portion 223b of the lower bracket overlapping portion 223, as shown in FIG. 4C. Once the connector assembly 10B of this second embodiment is assembled, the lanced tab 214a lanced inward enters the catch hole 224a from widthwise outside. In addition, similarly, the lanced tab 214b lanced outward enters the catch hole 224b from widthwise inside. Thereby, as in the case of the first embodiment, even if the upper bracket 20A and/or the lower bracket 20B deflects when this connector assembly 10B is extracted from the mating connector 70, they are kept caught on each other.

According to the first embodiment and the second embodiment, the connector assemblies 10A, 10B are easy to assemble and keep the upper bracket 20A and the lower bracket 20B caught on each other even if the bracket 20 deflects during extraction.

It should be noted that the circuit board 50 constituting the connector assemblies 10A, 10B described above, is an ordinary circuit board on which conductor wiring is formed on a dielectric slab by etching or the like. However, the circuit board defined in the present invention includes not only such an ordinary circuit board but also a planar circuit board having a conductor insert-molded therein (chicklet).

In addition, herein, a connector assembly 10A, 10B of a floating type has been described by way of example, but the connector assembly 10A, 10B is not exclusively applied to a floating type. The connector assembly 10A, 10B is also widely applicable to a non-floating type connector assembly having a structure in which a subassembly is sandwiched from above and below between an upper bracket and a lower bracket.

Moreover, herein, the bracket 20 supporting the subassembly 30 composed of a plurality of pairs (four pairs) of the individual connector 40 and the circuit board 50 connected to the individual connector 40 has been described. However, the subassembly 30 supported by the bracket 20 may be composed of only a single pair of one connector 40 and one circuit board 50. Moreover, the bracket 20 may be a bracket covering a connector not including a circuit board and acting as a shield or an electrical ground (earth), for example. Moreover, the bracket 20 is characterized by having a structure in which the upper bracket 20A and the lower bracket 20B are difficult to separate, and may be a bracket supporting not only a connector but also any supported body.

What is claimed is:

1. A bracket, comprising:
   an upper bracket; and
   a lower bracket, the upper bracket and the lower bracket supporting a supported body from above and below between the upper bracket and the lower bracket, the supported body has a plurality of first connectors arranged laterally and each having a mating portion facing sideward,
   the lower bracket has a lower bracket base portion supporting a lower face of the supported body, and a pair of lateral lower bracket sidewall portions extending upward from a pair of lateral ends of the lower bracket base portion,
   the upper bracket has an upper bracket base portion resting on the supported body, and a pair of lateral upper bracket sidewall portions extending downward from a pair of lateral ends of the upper bracket base portion to a height at which the lateral upper bracket sidewall portions overlap the lateral lower bracket sidewall portions in lateral directions,
   in an overlapping portion where the lateral lower bracket sidewall portions and the lateral upper bracket sidewall portions overlap each other in the lateral directions, a pair of first sidewall portions of one of the lateral lower bracket sidewall portions and the lateral upper bracket sidewall portions have a first adjacent portion located inside between a pair of second sidewall portions different from the first sidewall portions and adjacent to the second sidewall portions, and a second adjacent portion located outside the pair of second sidewall portions and adjacent to the second sidewall portions, the first adjacent portion has a first catch portion and the second adjacent portion has a second catch portion, and
   a third adjacent portion adjacent to an outside of the first adjacent portion and a fourth adjacent portion adjacent to an inside of the second adjacent portion, the third adjacent portion has a third catch portion catching the first catch portion and the fourth adjacent portion has a fourth catch portion catching the second catch portion, catching the lower bracket on the upper bracket.

2. The bracket of claim 1, wherein the lateral upper bracket sidewall portions have an outer adjacent portion extending downward from the upper bracket base portion and adjacent to an outside of the lateral lower bracket sidewall portions.

3. The bracket of claim 2, wherein the lateral upper bracket sidewall portions have an inner adjacent portion extending downward and bent from the upper bracket base portion, the inner adjacent portion disposed inside and adjacent to the lateral lower bracket sidewall portions.

4. The bracket of claim 1, wherein each of the first catch portion and the second catch portion is a catch hole.

5. The bracket of claim 4, wherein the third catch portion is a lanced tab lanced inwardly and the fourth catch portion is a lanced tab lanced outwardly.

6. The bracket of claim 5, wherein the lanced tab of the third catch portion enters the catch hole of the first catch portion and the lanced tab of the fourth catch portion enters the catch hole of the second catch portion.

7. The bracket of claim 1, wherein one of the first connectors is connected with a circuit board having a plug portion, the circuit board in an attitude in which the plug portion to be plugged into a second connector faces downward.

8. The bracket of claim 1, wherein a plurality of circuit boards are connected to the first connectors, each of the circuit boards connected to one of the first connectors, the plurality of circuit boards arranged laterally in an attitude in which a plug portion of each of the circuit boards faces downward.

9. A connector assembly, comprising:
   a plurality of first connectors arranged laterally and each having a mating portion facing sideward;
   a plurality of circuit boards each connected to a corresponding one of the plurality of first connectors and arranged laterally in an attitude having a plug portion to be plugged into a second connector facing downward; and
   a bracket having an upper bracket and a lower bracket and supporting the first connectors in a sandwiching manner from above and below between the upper bracket and the lower bracket,
   the lower bracket has a lower bracket base portion supporting a lower face of each of the first connectors, and a pair of lateral lower bracket sidewall portions extending upward from a pair of lateral ends of the lower bracket base portion,
   the upper bracket has an upper bracket base portion resting on the first connectors, and a pair of lateral upper bracket sidewall portions extending downward from a pair of lateral ends of the upper bracket base portion to a height at which the lateral upper bracket sidewall portions overlap the lateral lower bracket sidewall portions laterally,
   in an overlapping portion where the lateral lower bracket sidewall portions and the lateral upper bracket sidewall portions overlap each other laterally, a pair of first sidewall portions of one of the lateral lower bracket sidewall portions and the lateral upper bracket sidewall portions have a first adjacent portion located inside between a pair of second sidewall portions different from the first sidewall portions and adjacent to the second sidewall portions, and a second adjacent portion located outside the pair of second sidewall portions and adjacent to the second sidewall portions, the first adjacent portion has a first catch portion and the second adjacent portion has a second catch portion, and
   a third adjacent portion adjacent to an outside of the first adjacent portion and a fourth adjacent portion adjacent to an inside of the second adjacent portion, the third adjacent portion has a third catch portion catching the first catch portion and the fourth adjacent portion has a fourth catch portion catching the second catch portion, catching the lower bracket on the upper bracket.

10. A bracket, comprising:

an upper bracket; and a lower bracket, the upper bracket and the lower bracket supporting a supported body from above and below between the upper bracket and the lower bracket, the supported body is a first connector connected with a circuit board having a plug portion, the circuit board in an attitude in which the plug portion to be plugged into a second connector faces downward, the lower bracket has a lower bracket base portion supporting a lower face of the supported body, and a pair of lateral lower bracket sidewall portions extending upward from a pair of lateral ends of the lower bracket base portion, the upper bracket has an upper bracket base portion resting on the supported body, and a pair of lateral upper bracket sidewall portions extending downward from a pair of lateral ends of the upper bracket base portion to a height at which the lateral upper bracket sidewall portions overlap the lateral lower bracket sidewall portions in lateral directions, in an overlapping portion where the lateral lower bracket sidewall portions and the lateral upper bracket sidewall portions overlap each other in the lateral directions, a pair of first sidewall portions of one of the lateral lower bracket sidewall portions and the lateral upper bracket sidewall portions have a first adjacent portion located inside between a pair of second sidewall portions different from the first sidewall portions and adjacent to the second sidewall portions, and a second adjacent portion located outside the pair of second sidewall portions and adjacent to the second sidewall portions, the first adjacent portion has a first catch portion and the second adjacent portion has a second catch portion, and a third adjacent portion adjacent to an outside of the first adjacent portion and a fourth adjacent portion adjacent to an inside of the second adjacent portion, the third adjacent portion has a third catch portion catching the first catch portion and the fourth adjacent portion has a fourth catch portion catching the second catch portion, catching the lower bracket on the upper bracket.

11. A bracket, comprising:

an upper bracket; and a lower bracket, the upper bracket and the lower bracket supporting a supported body from above and below between the upper bracket and the lower bracket, the lower bracket has a lower bracket base portion supporting a lower face of the supported body, and a pair of lateral lower bracket sidewall portions extending upward from a pair of lateral ends of the lower bracket base portion, the upper bracket has an upper bracket base portion resting on the supported body, and a pair of lateral upper bracket sidewall portions extending downward from a pair of lateral ends of the upper bracket base portion to a height at which the lateral upper bracket sidewall portions overlap the lateral lower bracket sidewall portions in lateral directions, in an overlapping portion where the lateral lower bracket sidewall portions and the lateral upper bracket sidewall portions overlap each other in the lateral directions, a pair of first sidewall portions of one of the lateral lower bracket sidewall portions and the lateral upper bracket sidewall portions have a first adjacent portion located inside between a pair of second sidewall portions different from the first sidewall portions and adjacent to the second sidewall portions, and a second adjacent portion located outside the pair of second sidewall portions and adjacent to the second sidewall portions, the first adjacent portion has a first catch portion and the second adjacent portion has a second catch portion, and a third adjacent portion adjacent to an outside of the first adjacent portion and a fourth adjacent portion adjacent to an inside of the second adjacent portion, the third adjacent portion and the fourth adjacent portion lie in a same plane, the third adjacent portion has a third catch portion catching the first catch portion and the fourth adjacent portion has a fourth catch portion catching the second catch portion, catching the lower bracket on the upper bracket.

* * * * *